United States Patent [19]
Kihara et al.

[11] Patent Number: 5,675,086
[45] Date of Patent: Oct. 7, 1997

[54] ELECTROSTATIC CAPACITY-TYPE PRESSURE SENSOR

[75] Inventors: Takashi Kihara; Yoshiyuki Ishikura; Shigeo Kimura; Yasuhiro Goshoo, all of Fujisawa, Japan

[73] Assignee: Yamatake-Honeywell Co., Ltd., Japan

[21] Appl. No.: 680,173

[22] Filed: Jul. 15, 1996

[30] Foreign Application Priority Data

Jul. 17, 1995 [JP] Japan .................... 7-179916

[51] Int. Cl.$^6$ .................................. G01L 9/12
[52] U.S. Cl. ................... 73/718; 73/724; 361/283.4
[58] Field of Search ............... 73/718, 724; 361/283.1, 361/283.2, 283.3, 283.4

[56] References Cited

U.S. PATENT DOCUMENTS

| | | | |
|---|---|---|---|
| 3,479,879 | 11/1969 | Music | 73/718 |
| 4,120,206 | 10/1978 | Rud, Jr. | 73/718 |
| 4,388,833 | 6/1983 | Kuwayama | 73/718 |
| 4,445,383 | 5/1984 | Binder et al. | 73/718 |
| 4,507,972 | 4/1985 | Morita | 73/718 X |
| 4,523,474 | 6/1985 | Browne et al. | 73/724 |
| 4,735,098 | 4/1988 | Kavli et al. | 73/718 |
| 4,873,870 | 10/1989 | Delatorre | 73/718 X |
| 5,006,952 | 4/1991 | Thomas | 73/718 X |
| 5,056,369 | 10/1991 | Tamai et al. | 73/718 |
| 5,209,121 | 5/1993 | Hafner | 73/727 |
| 5,259,247 | 11/1993 | Bantien | 73/718 |
| 5,412,992 | 5/1995 | Tobita et al. | 73/721 |
| 5,471,884 | 12/1995 | Czarnocki et al. | 73/720 |
| 5,485,345 | 1/1996 | Lukasiewicz et al. | 361/283.3 |
| 5,507,186 | 4/1996 | Weiblen et al. | 73/723 |
| 5,522,267 | 6/1996 | Lewis et al. | 73/726 |

FOREIGN PATENT DOCUMENTS

| | | | |
|---|---|---|---|
| 56-79225 | 6/1981 | Japan | 73/724 |
| 56-142433 | 11/1981 | Japan | 73/718 |
| 4-177137 | 6/1992 | Japan | 73/724 |
| 6-186106 | 7/1994 | Japan | 73/724 |

*Primary Examiner*—Elizabeth L. Dougherty
*Assistant Examiner*—Paul D. Amrozowicz
*Attorney, Agent, or Firm*—VanOhem Meehan & VanOphem, P.C.

[57] ABSTRACT

An electrostatic capacity-type pressure sensor includes a diaphragm support body, first and second lids, a fixed electrode, a coupling member, an electrode support member, and a movable electrode. The diaphragm support body is formed into a tube shape. The first and second lids have thin diaphragm portions and thick fixing portions formed integrally with peripheral edge portions of the diaphragm portions and are arranged to face each other by bringing the fixing portions in tight contact with the two end portions of the diaphragm support body. The first and second lids separate the interior of the diaphragm support body from the outside by closing the two end portions of the diaphragm support body. The fixed electrode is formed on the inner surface of the fixing portion of at least one of the first and second lids. The coupling member has two ends respectively connected to the first and second lids to couple the diaphragm portions facing each other. The electrode support member is supported by the coupling member and arranged between the first and second lids at a predetermined interval. The movable electrode is formed on the electrode support member so as to face the fixed electrode. The movable electrode and the fixed electrodes are arranged parallel to each other at a predetermined interval to constitute a capacitor.

10 Claims, 3 Drawing Sheets

ELECTROSTATIC CAPACITY-TYPE PRESSURE SENSOR

BACKGROUND OF THE INVENTION

1. Field of the Invention

The present invention relates to an electrostatic capacity-type pressure sensor with a diaphragm structure for detecting a change in pressure to be measured in an electrostatic capacity manner.

2. Description of the Prior Art

FIG. 4 shows the structure of a conventional electrostatic capacity-type pressure sensor. In FIG. 4, reference numeral 1 denotes a frame body as a diaphragm support body; 2 and 3, a pair of thin diaphragms formed to close opening portions at the two ends of the frame body 1; 4, a support for connecting and fixing the pair of diaphragms 2 and 3 in the frame body 1; 5, a movable electrode support plate fixed to the support 4 so as to face the diaphragms 2 and 3; and 6a and 6b, movable electrodes respectively consisting of thin conductive films and formed on the two surfaces of the movable electrode support plate 5.

Reference numerals 7a and 7b denote fixed electrode support plates which face each other via the movable electrode support plate 5, allow the support 4 to be inserted therethrough, and are fixed to the inner wall surfaces of the frame body 1; and 8a and 8b, fixed electrodes respectively consisting of thin conductive films and formed on the surfaces of the fixed electrode support plates 7a and 7b so as to face the corresponding movable electrodes 6a and 6b of the movable electrode support plate 5. The frame body 1, the diaphragms 2 and 3, the support 4, the movable electrodes 6a and 6b, and the fixed electrode support plates 7a and 7b consist of a material such as sapphire glass.

The movable electrodes 6a and 6b and the fixed electrodes 8a and 8b are arranged via intra-electrode gaps G (about 1 μm) to face each other and form capacitors C1 and C2. The capacitors C1 and C2 constitute a capacity-type sensor element. The interior of this sensor element is separated from the outer surroundings and completely sealed to keep a vacuum state or sealed with a gas. Reference symbols P1 and P2 denote measurement pressures to be applied to the diaphragms 2 and 3.

In the electrostatic capacity-type pressure sensor with the above structure, when the measurement pressures P1 and P2 are applied to the diaphragms 2 and 3, the diaphragms 2 and 3 are deformed to complementarily change the capacitance value of the capacitor C1 constituted by the fixed electrode 8a and the movable electrode 6a and the capacitance value of the capacitor C2 constituted by the fixed electrode 8b and the movable electrode 6b. Therefore, a pressure difference P1–P2 (P1>P2) can be detected by measuring the changes in capacitance values of the capacitors C1 and C2. Note that the electrostatic capacity-type pressure sensor of this type is disclosed in, e.g., Japanese Patent Laid-Open No. 6-186106.

In the electrostatic capacity-type pressure sensor with the above arrangement, however, the mechanical strength of the fixed electrode support plates 7a and 7b must be stabilized. That is, the intra-electrode gap G between the movable electrode 6a and the fixed electrode 8a or the movable electrode 6b and the fixed electrode 8b is normally about 1 μm. For this reason, a slight change in positions of the fixed electrode support plates 7a and 7b changes the capacitance values of the capacitors C1 and C2 regardless of the displacement of the diaphragms, directly affecting the measurement accuracy. Therefore, highly accurate size management is required in the manufacture, and such a manufacturing method is also required which can reliably prevent an internal stress produced with a deterioration over time.

The assembly structure of the fixed electrode support plates 7a and 7b and the movable electrode support plate 5 is complicated, resulting in an increase in the number of processes during manufacture. In addition, the propositions of an increase in strength and downsizing of the fixed electrode support plates 7a and 7b contradict each other. For example, if the fixed electrode support plates 7a and 7b are made thin to realize downsizing, they are more easily deformed and the capacitance values of the capacitors C1 and C2 change regardless of the displacement of the diaphragms, and a degradation in performance such as a zero shift, occurs.

SUMMARY OF THE INVENTION

It is an object of the present invention to provide an electrostatic capacity-type pressure sensor whose manufacturing process can be greatly decreased due to a simple structure and which can be easily downsized.

It is another object of the present invention to provide a high-performance electrostatic capacity-type pressure sensor free from a performance degradation caused by downsizing.

In order to achieve the above objects, according to the present invention, there is provided an electrostatic capacity-type pressure sensor embodying a diaphragm support body formed into a tube shape, first and second lids having thin diaphragm portions and thick fixing portions formed integrally with peripheral edge portions of the diaphragm portions and arranged to face each other by bringing the fixing portions in tight contact with two end portions of the diaphragm support body, the first and second lids separating an interior of the diaphragm support body from the outside by closing the two end portions of the diaphragm support body, a fixed electrode formed on an inner surface of the fixing portion of at least one of the first and second lids, a coupling member having two ends respectively connected to the first and second lids to couple the diaphragm portions facing each other, an electrode support member supported by the coupling member and arranged between the first and second lids at a predetermined interval, and a movable electrode formed on the electrode support member so as to face the fixed electrode, the movable electrode and the fixed electrodes being arranged parallel to each other at a predetermined interval to constitute a capacitor.

DESCRIPTION OF THE PREFERRED EMBODIMENT

The present invention will be described in detail below with reference to the accompanying drawings.

Figure 1:
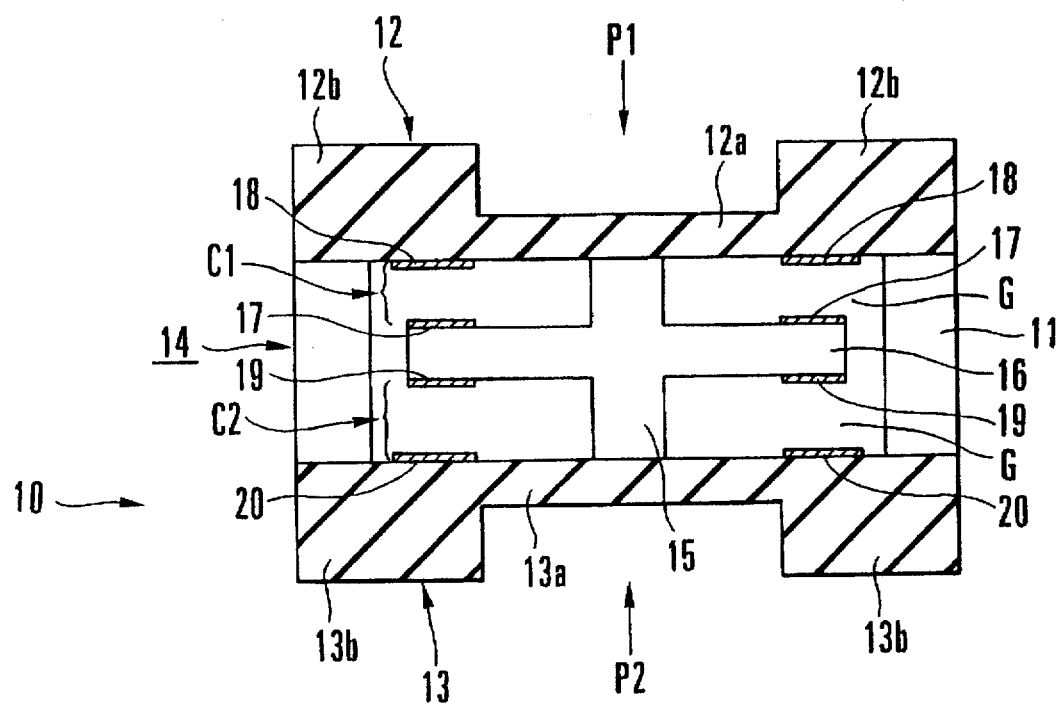
FIG. 1 is a sectional view showing an electrostatic capacity-type pressure sensor according to an embodiment of the present invention.

FIG. 1 shows a cross-section of an electrostatic capacity-type pressure sensor 10 according to the preferred embodiment of the present invention. In FIG. 1, reference numeral 11 denotes a frame body as a diaphragm support body formed into an almost square tube shape; and reference numerals 12 and 13 denote first and second lids respectively provided opposite to each other so as to close opening portions at the two ends of the frame body 11. The interior of the frame body 11 is separated from the outside and sealed by the first and second lids 12 and 13.

The first and second lids 12 and 13 are constituted by diaphragm portions 12a and 13a respectively formed thinly at the central portions and fixing portions 12b and 13b formed thickly at the peripheral edge portions, respectively. The diaphragm portions 12a and 13a and the fixing portions 12b and 13b are preferably formed integrally and unitarily. The inner periphery of the fixing portion 12b or 13b or the outer periphery of the diaphragm portion 12a or 13a, i.e., the connection portion between the diaphragm portion 12a or 13a and the fixing portion 12b or 13b, respectively each has a size smaller than the inner size of the frame body 11.

The diaphragm portions 12a and 13a of the first and second lids 12 and 13, respectively are arranged to face each other at the central portion of the frame body 11 by bringing the fixing portions 12b and 13b in tight contact with the opening portions at the two ends of the frame body 11 to arrange the first and second lids 12 and 13 to face each other. The first and second lids 12 and 13 are fixed and held in this state to constitute a housing 14.

Reference numeral 15 denotes a support connected and fixed between the opposite surfaces of the diaphragm portions 12a and 13a of the first and second lids 12 and 13 in the frame body 11 to couple the diaphragm portions 12a and 13a; and reference numeral 16 denotes an electrode support plate supported by and fixed to the support 15 so as to face the first and second diaphragm portions 12a and 13a and is preferably formed integrally and unitarily with the support 15. The electrode support plate 16 preferably has a size smaller than the inner size of the frame body 11 and larger than that of the connection portion between the diaphragm portion 12a or 13a and the fixing portion 12b or 13b.

Reference numeral 17 denotes a first movable electrode consisting of a thin conductive film and formed at a peripheral edge portion, overlapping with the fixing portion 12b, on one surface side of the electrode support plate 16; and reference numeral 18 denotes a first fixed electrode consisting of a thin conductive film and formed on the inner surface side of the fixing portion 12b of the first lid 12 forming an intra-electrode gap G (about 1 μm) with the facing first movable electrode 17 of the electrode support plate 16. The first movable electrode 17 and the first fixed electrode 18 are arranged to face each other, and define the intra-electrode gap G to constitute a capacitor C1.

Reference numeral 19 denotes a second movable electrode consisting of a thin conductive film and formed at a peripheral edge portion, overlapping with the fixing portion 13b, on the other surface side of the electrode support plate 16; and reference numeral 20 denotes a second fixed electrode consisting of a thin conductive film and formed on the inner surface side of the fixing portion 13b of the second lid 13 so as to face the second movable electrode 19 of the electrode support plate 16. The second movable electrode 19 and the second fixed electrode 20 are arranged to face each other and define the intra-electrode gap G to and constitute a capacitor C2. The capacitors C1 and C2 preferably have the same base capacitance value with the same structure (base capacitance value obtained when measurement pressures P1 and P2 are not applied). The interior of the frame body 11 having the capacitors C1 and C2 formed therein is separated from the outer surroundings and is completely sealed. The capacity-type sensor element 10 is constituted by keeping the sealed interior of the frame body 11 a vacuum or sealing the interior with a gas.

Note that the first and second lids 12 and 13 consist of an insulating material such as glass, silica, or sapphire, whereas the frame body 11, the support 15, and the movable electrode support plate 16 consist of, e.g., silicon.

In the electrostatic capacity-type pressure sensor 10 according to the present invention, when the measurement pressures P1 and P2 are respectively applied to the diaphragm portions 12a and 13a of the first and second lids 12 and 13, respectively, to produce a pressure difference (P1−P2), the diaphragm portions 12a and 13a and the support 15 are integrally displaced. The capacitance value of the capacitor C1 constituted by the first movable electrode 17 and the first fixed electrode 18 and the capacitance value of the capacitor C2 constituted by the second movable electrode 19 and the second fixed electrode 20 increase/decrease upon the displacement of the diaphragm portions 12a and 13a. Changes in the two capacitance values C1 and C2 can be measured to detect the measurement pressure.

With this arrangement, the base capacitance values of the capacitors C1 and C2 are canceled to obtain only changes in capacitance values in accordance with the pressure difference (P1−P2). All the factors of errors caused by a change in atmospheric surroundings can be completely removed. As a result, a pressure range from a very low pressure up to a high pressure can be measured with a wide dynamic range, and at the same time the pressure can be measured with a high accuracy and a high reliability.

Figure 2A:
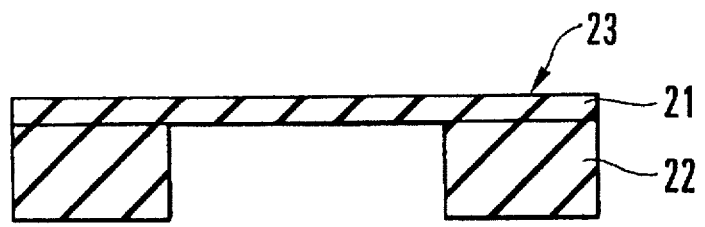
FIGS. 2A through 2E are sectional views of the electrostatic capacity-type pressure sensor shown in FIG. 1, respectively, showing the steps in a method of manufacturing the pressure sensor.

FIGS. 2A through 2E show the electrostatic capacity-type pressure sensor 10 in FIG. 1 detailing the respective steps in a method of manufacturing the pressure sensor 10. First, as shown in FIG. 2A, an insulating substrate 21 is bonded by a direct bonding method to a thick insulating ring 22 having an opening formed by an ultrasonic process or a laser process to have a size equal to that of the diaphragm portions 12a and 13a. In this manner, a lid structure 23 corresponding to the first or second lid 12 or 13 is formed.

Figure 2B:
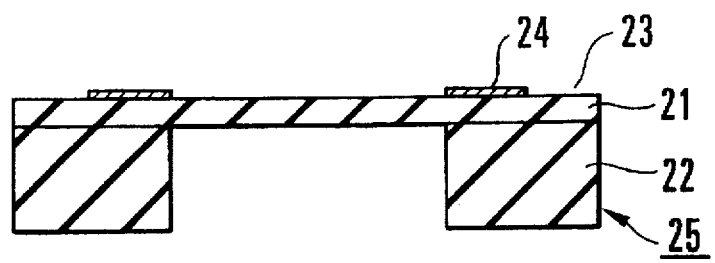

Next, a thin metal film consisting of an electrode material such as Pt or Au is formed on the insulating substrate 21 of the lid structure 23 by deposition, sputtering, ion plating, or the like. The thin metal film is patterned by photolithography, etching, or a lift-off method to form a fixed electrode 24 corresponding to the first or second fixed electrode 18 or 20 in a predetermined region, corresponding to the insulating ring 22, on the insulating substrate 21, as shown in FIG. 2B. In this manner, a lid structure 25 with an electrode is formed.

Figure 2C:
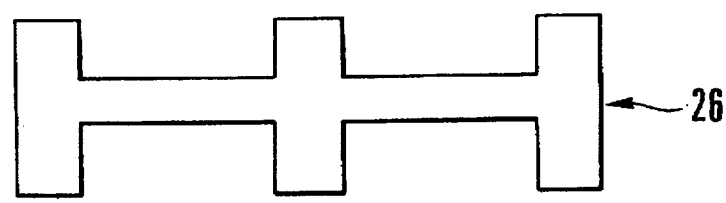

As shown in FIG. 2C, an oxide film (not shown) is patterned in regions, corresponding to the frame body 11 and the support 15, on the two surfaces of a silicon wafer. Then, the silicon wafer is dipped in an etching solution such as KOH or TMAH to form a block body 26. As will be described below, the block body 26 is a silicon block on which the frame body 11, the support 15, and the electrode support plate 16 are integrated. In forming the block body 26, the distance between the first movable electrode 17 and the first fixed electrode 18 and the distance between the second movable electrode 19 and the second fixed electrode 20, i.e., the capacitance values of the capacitors C1 and C2, are controlled by the etching time of the silicon wafer. The first and second movable electrodes 17 and 19 are formed by growing polysilicon in predetermined regions on the two surfaces of the electrode support plate 16 consisting of a silicon material so as to face the first and second fixed electrodes 18 and 20, respectively.

Figure 2D:
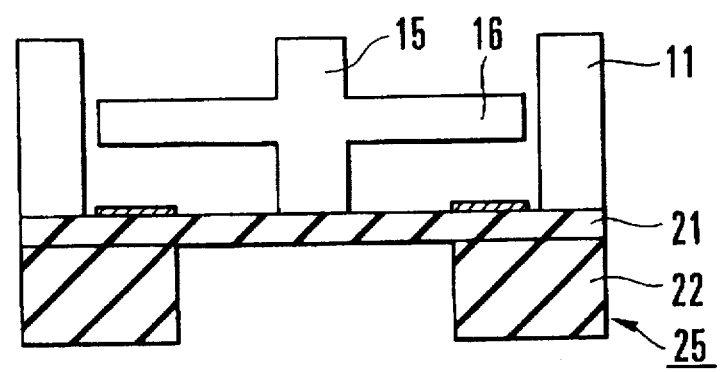

As shown in FIG. 2D, the block body 26 in FIG. 2C from which the oxide film is removed is bonded to the lid structure 25 with the electrodes aligned in their respective predetermined directions. Then, the joint portion between the electrode support plate 16 and the frame body 11 is etched and removed by dry etching to form a space therethrough. The block body 26 is divided in this manner, and the unit of the frame body 11, the support 15, and the electrode support plate 16 supported by and fixed to the support 15 is formed. As a method of bonding the block body 26 to the lid structure 25 with the electrode, an anode bonding method, a direct bonding method, an anode bonding method via thin pyrex glass, or the like is properly selected in accordance with the material.

Figure 2E:
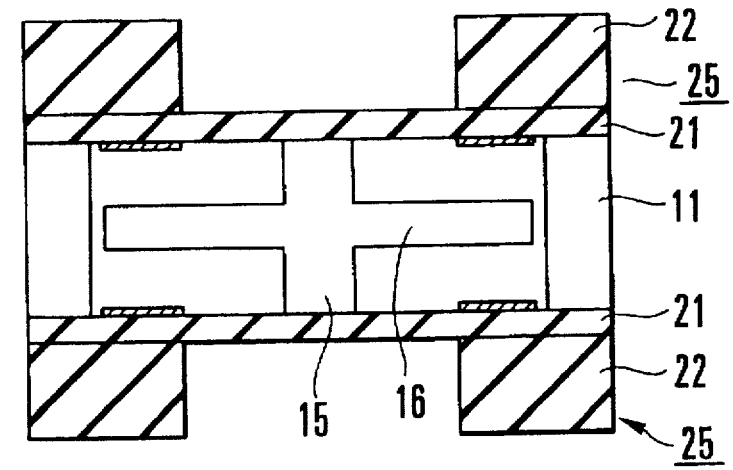

As shown in FIG. 2E, another lid structure 25 with an electrode which has been formed in the step of FIG. 2B is bonded to the frame body 11 and the support 15 in a predetermined direction. As a result, the capacity-type sensor element shown in FIG. 1 is completed.

Figure 3:
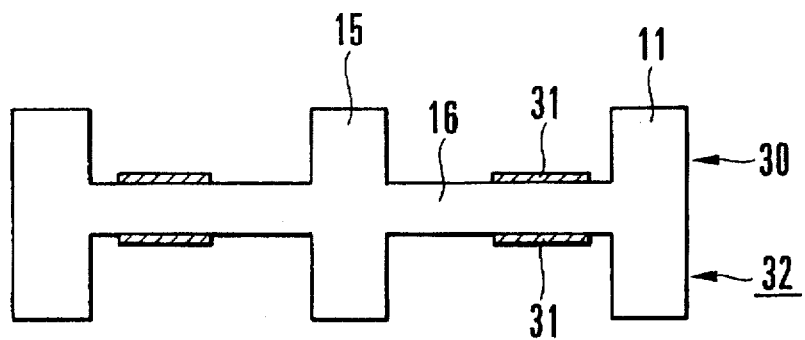
FIG. 3 is a sectional view of the electrostatic capacity-type pressure sensor so as to explain the main step in another method of manufacturing the pressure sensor according to the present invention.
Figure 4:
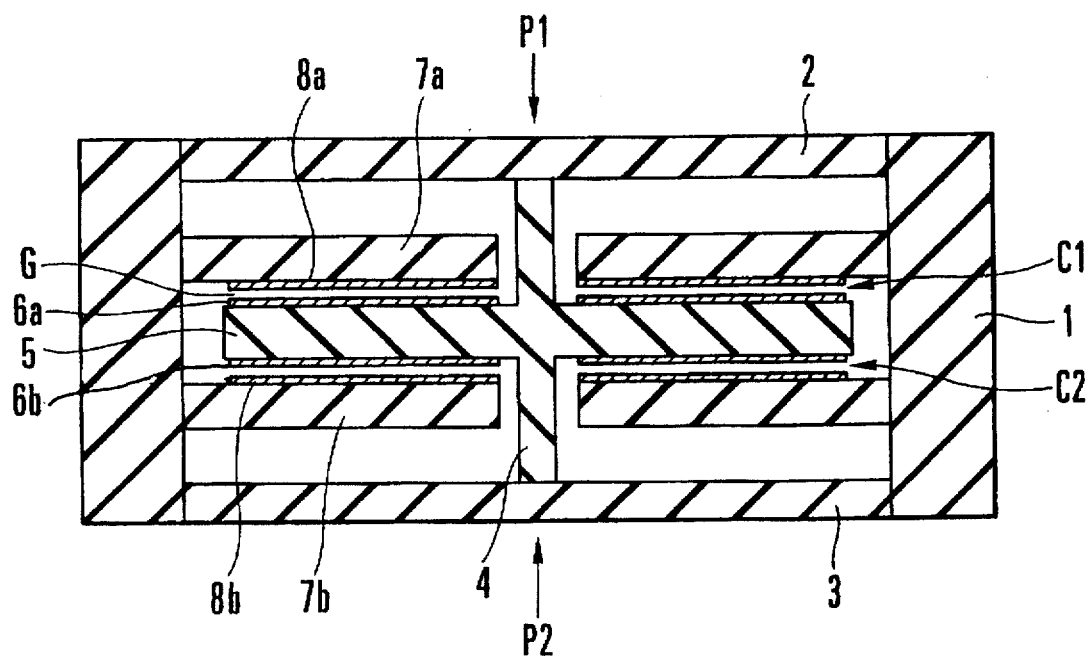
FIG. 4 is a sectional view showing a conventional prior art, electrostatic capacity-type pressure Sensor.

FIG. 3 shows a step to explain the main part of an alternative method of manufacturing the electrostatic capacity-type pressure sensor 10 in FIG. 1. The step shown in FIG. 3 corresponds to the step of FIG. 2C when the frame body 11, the support 15, and the electrode support plate 16 are formed of a glass material. In this example, resists or thin metal films (not shown) are patterned on the two surfaces of a glass substrate. Then, the resultant structure is dipped in, e.g., an HF etching solution or dry-etched to form a block body 30 constituting the frame body 11, the support 15, and the electrode support plate 16.

An electrode material such as Pt or Au on the block body 30 is patterned into a predetermined shape by deposition, sputtering, ion plating, or the like. Movable electrodes 31 corresponding to the first and second movable electrodes 17 and 19 are formed to form a block body 32 with electrodes. The subsequent steps are the same as shown in FIGS. 2D and 2E.

In the case of the block body 32, the distance between the first movable electrode 17 and the first fixed electrode 18 and the distance between the second movable electrode 19 and the second fixed electrode 20, i.e., the capacitance values of the capacitors C1 and C2, are controlled by the etching time of a glass substrate and the thickness of the movable electrode 31.

According to the above-described embodiments, the first and second fixed electrodes 18 and 20 are formed at the fixing portions 12b and 13b to have sufficient mechanical strengths on the first and second lids 12 and 13. With this arrangement, a degradation such as a zero shift caused by deformation of the fixing portions 12b and 13b is prevented.

In addition, no fixed electrode support plate for supporting the first and second fixed electrodes 18 and 20 is formed on the frame body 11, so that the structure of the electrode support plate 16 is simplified because it need not be complicatedly assembled with the fixed electrode support plate. As a result, the manufacturing steps are decreased in number, and the manufacture is facilitated.

Note that the above-described embodiment exemplifies the case in which the first and second diaphragm portions 12a and 13a have a square shape. However, they can be similarly constituted even with a circular or another shape.

In addition, the shape of the frame body 11 is not limited to a square tube, and it may be similarly constituted even with a tube or another shape.

The above-described embodiment exemplifies the case in which the housing 14 embodies the capacitor C1 constituted by the first movable electrode 17 and the first fixed electrode 18 and the capacitor C2 constituted by the second movable electrode 19 and the second fixed electrode 20 therein. However, the present invention is not limited to this, and only either one of the capacitors C1 and C2 may be constituted.

As has been described above, according to the present invention, a thick fixing portion is formed on at least one of the first and second lids 12 and 13 which seal the two end portions of the frame body 11, and a fixed electrode is formed on the thick fixing portion. A fixed electrode mounting portion is strengthened to prevent deformation. Therefore, a performance degradation such as a zero shift does not occur.

A fixed electrode support plate for supporting a fixed electrode can be eliminated. The arrangement is simplified, the manufacturing steps are decreased in number, the internal stress generated in the manufacture is reduced, and size reduction and a decrease in thickness are realized.

Further, according to the present invention, fixed and movable electrodes are hardly degraded because the fixed and movable electrodes are separated from a fluid having a pressure to be measured. When two pairs of counter fixed and movable electrodes are formed, original capacitance values can be canceled because one capacitance value increases while the other decreases. Therefore, the measurement accuracy can be greatly increased.

While the invention has been described in terms of a preferred embodiment, it is apparent that other forms could be adopted by one skilled in the art. Accordingly, the scope of the invention is to be limited only by the following claims.

What is claimed is:

1. An electrostatic capacity-type pressure sensor comprising:

a diaphragm support body formed into a tube shape;

first and second lids made of an insulating material and each having a thin diaphragm portion, said first and second lids each having a thick fixing portion formed integrally with a peripheral edge portion of said diaphragm portions, respectively, and arranged to face each other by bringing said thick fixing portions in tight contact with two end portions of said diaphragm support body, said first and second lids separating an interior of said diaphragm support body from the outside by closing said two end portions of said diaphragm support body;

a fixed electrode formed directly on an inner surface of said thick fixing portion of at least one of said first and second lids;

a coupling member having two ends respectively connected to said first and second lids to couple said diaphragm portions facing each other;

an electrode support member supported by said coupling member and arranged between said first and second lids at a predetermined interval; and a movable electrode formed on said electrode support member facing said fixed electrode, said movable electrode and said fixed electrode being arranged parallel to each other at a predetermined interval to constitute a capacitor.

2. A sensor according to claim 1, wherein said coupling member is constituted by a support, said electrode support member is constituted by a support plate vertically supported by said support and arranged parallel to said first and second lids, and said movable electrode is formed on a side surface of said support plate.

3. A sensor according to claim 2, wherein said electrode support plate has a size smaller than an inner size of said diaphragm support body and larger than a size of a connection portion between each diaphragm portion and each thick fixing portion, and said movable electrode is formed at a peripheral edge portion of said side surface of said electrode support plate which overlaps said thick fixing portion.

4. A sensor according to claim 1, wherein said coupling member and said electrode support member are formed integrally.

5. A sensor according to claim 1 wherein said fixed electrode is aligned substantially flush with said thin diaphragm portion.

6. An electrostatic capacity-type pressure sensor comprising:

a diaphragm support body formed into a tube shape;

first and second lids made of an insulating material and each having a thin diaphragm portion, said first and second lids each having a thick fixing portion formed integrally with peripheral edge portions of said diaphragm portions and arranged to face each other by bringing said thick fixing portions in tight contact with two end portions of said diaphragm support body, said first and second lids separating an interior of said diaphragm support body from the outside by closing said two end portions of said diaphragm support body;

a first fixed electrode formed directly on an inner surface of said thick fixing portion of said first lid;

a second fixed electrode formed on an inner surface of said thick fixing portion of said second lid;

a coupling member having two ends connected to said first and second lids to couple said diaphragm portions facing each other;

an electrode support member supported by said coupling member and arranged between said first and second lids at a predetermined interval;

a first movable electrode formed on said electrode support member facing said first fixed electrode, said first movable electrode and said first fixed electrode being arranged parallel to each other at a predetermined interval to constitute a first capacitor; and a second movable electrode formed on said electrode support member facing said second fixed electrode, said second moveable electrode and said second fixed electrode being arranged parallel to each other at a predetermined interval to constitute a second capacitor. electrode is aligned substantially flush with said thin diaphragm portion.

a second movable electrode formed on said electrode support member so as to face said second fixed electrode, said second movable electrode and said second fixed electrode being arranged parallel to each other at a predetermined interval to constitute a second capacitor.

7. A sensor according to claim 6, wherein said coupling member is constituted by a support, said electrode support member is constituted by a support plate vertically supported by said support and arranged parallel to said first and second lids, and said first and second movable electrodes are formed on two side surfaces of said support plate.

8. A sensor according to claim 7, wherein said electrode support plate has a size smaller than an inner size of said diaphragm support body and larger than a size of a connection portion between each diaphragm portion and each thick fixing portion, and said first and second movable electrodes are formed at peripheral edge portions of said two side surfaces of said electrode support plate which overlap said thick fixing portions.

9. A sensor according to claim 6, wherein said coupling member and said electrode support member are formed integrally.

10. A sensor according to claim 5 wherein said first and second fixed electrodes are aligned substantially flush with said thin diaphragm portions, respectively.

* * * * *

UNITED STATES PATENT AND TRADEMARK OFFICE
CERTIFICATE OF CORRECTION

PATENT NO. : 5,675,086
DATED : October 7, 1997
INVENTOR(S) : Kihara et al.

It is certified that error appears in the above-identified patent and that said Letters Patent is hereby corrected as shown below:

Column 2, line 62, kindly delete "Sensor" and insert ---- sensor ----.

Column 3, line 12, after "13a", kindly insert a comma ---- , ----;

same line, after "respectively", kindly insert a comma ---- , ----.

Column 3, line 20, after "respectively", kindly insert a comma ---- , ----.

Column 3, line 24, after "respectively", kindly insert a comma ---- , ----.

Column 3, line 65, after "to", kindly delete "and".

Column 8, line 12, beginning "electrode is aligned…" through

UNITED STATES PATENT AND TRADEMARK OFFICE
CERTIFICATE OF CORRECTION

PATENT NO. : 5,675,086
DATED : October 7, 1997
INVENTOR(S) : Kihara et al.

It is certified that error appears in the above-identified patent and that said Letters Patent is hereby corrected as shown below:

Column 8, line 20, "...capacitor." delete in their entirety.

Signed and Sealed this

Seventeenth Day of November, 1998

Attest:

BRUCE LEHMAN

*Attesting Officer*        *Commissioner of Patents and Trademarks*